United States Patent
Madau

(10) Patent No.: US 7,602,276 B2
(45) Date of Patent: Oct. 13, 2009

(54) VARIABLE BLIND SPOT WARNING SYSTEM

(75) Inventor: Dinu Petre Madau, Canton, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 261 days.

(21) Appl. No.: 11/654,118

(22) Filed: Jan. 17, 2007

(65) Prior Publication Data

US 2008/0169938 A1   Jul. 17, 2008

(51) Int. Cl.
*B60Q 1/00* (2006.01)
(52) U.S. Cl. .................. 340/435; 340/436; 340/438; 340/903; 701/301; 359/843
(58) Field of Classification Search ............... 340/435, 340/3.1, 901, 903, 904, 436, 438; 701/49, 701/96, 301; 359/843, 841, 844, 871–877
See application file for complete search history.

(56) References Cited

U.S. PATENT DOCUMENTS

| | | | |
|---|---|---|---|
| 5,517,196 A | 5/1996 | Pakett et al. | |
| 6,175,300 B1 | 1/2001 | Kendrick | |
| 6,193,380 B1 * | 2/2001 | Jacobs | 359/843 |
| 6,198,409 B1 * | 3/2001 | Schofield et al. | 340/903 |
| 6,547,405 B2 | 4/2003 | Jacobs | |
| 6,672,727 B1 | 1/2004 | Lohss | |
| 6,727,808 B1 | 4/2004 | Uselmann et al. | |
| 6,734,807 B2 | 5/2004 | King | |
| 6,737,964 B2 | 5/2004 | Samman et al. | |
| 6,880,941 B2 * | 4/2005 | Suggs | 359/843 |
| 6,927,677 B2 | 8/2005 | Anderson et al. | |
| 7,061,373 B2 | 6/2006 | Takahashi | |
| 2004/0246113 A1 | 12/2004 | Strumolo et al. | |
| 2005/0111117 A1 | 5/2005 | Qualich et al. | |

FOREIGN PATENT DOCUMENTS

| | | |
|---|---|---|
| DE | 38 27 879 | 8/1989 |
| DE | 100 16 222 | 10/2001 |
| DE | 102 20 569 | 11/2003 |
| DE | 10 2004 042 959 | 3/2006 |
| EP | 0 655 142 B1 | 6/1999 |

* cited by examiner

*Primary Examiner*—Toan N Pham
(74) *Attorney, Agent, or Firm*—Brinks Hofer Gilson & Lione

(57) ABSTRACT

A variable blind spot warning system for detecting objects in a blind spot of a motor vehicle. The system includes at least one movable side view device coupled to a position sensor. The position sensor generates a position signal corresponding to an orientation of the side view device. At least one external detector generates a detector signal corresponding to a location of objects outside of the motor vehicle. A processor reads the position signal and the detector signal and calculates blind spot boundaries based on the position signal. The processor thereafter compares the blind spot boundaries to the object locations and provides an indication to a driver of the vehicle if an object is within the calculated blind spot boundaries.

16 Claims, 4 Drawing Sheets

VARIABLE BLIND SPOT WARNING SYSTEM

BACKGROUND

1. Field of the Invention

The present invention generally relates to intelligent transportation systems. More specifically, the invention relates to blind spot warning systems for motor vehicles.

2. Description of Related Art

When a driver of a motor vehicle desires to change lanes the driver will first glance in an appropriate side view mirror to make sure the lane is clear. However, the view provided by the side view mirror is limited and does not show the entire lane adjacent to the motor vehicle. The portion of the adjacent lane not shown in the side view mirror is called a blind spot. To check the blind spot requires the driver to turn their head and look over their shoulder, resulting in a potentially dangerous situation since it requires the driver to completely take his or her eyes off of the road ahead.

To minimize the need for the driver to look over his or her shoulder, some vehicles have implemented blind spot warning systems. Blind spot warning systems use an external detector and a processor to alert a driver to the presence of an object in the blind spot before the driver changes lanes. However, existing systems assume fixed blind spot boundaries and only provide a warning if an object is within the fixed blind spot boundaries. These systems do not account for those drivers who adjust their side view mirrors to, for example, show the blind spot and create a new blind spot having different boundaries.

In view of the above, it is apparent that there exists a need for an improved blind spot warning system.

SUMMARY

In satisfying the above need, as well as overcoming the enumerated drawbacks and other limitations of the related art, the present invention provides a blind spot warning system for detecting objects in a blind spot of a motor vehicle. The system includes at least one movable side view device, such as a side view mirror or other device, attached to the vehicle and coupled to at least one position sensor. The position sensor generates a position signal corresponding to an orientation of the side view device. At least one external detector is attached to the vehicle and generates a detector signal corresponding to a location of objects outside of the vehicle. A processor is disposed within the motor vehicle and coupled to the position sensor and the external detector, and is configured to read the position signal and the detector signal. The processor dynamically calculates blind spot boundaries based on the position signal, compares the blind spot boundaries to the object locations, and provides an indication to a driver of the vehicle if the objects are located within the calculated blind spot boundaries.

A modified position signal is generated by the position sensor upon movement of the side view device. The processor calculates altered blind spot boundaries based upon the modified position signal and compares the altered blind spot boundaries to the detector signal. If objects are within the altered blind spot boundaries, the processor provides the indication to the driver.

In some embodiments a warning indicator is attached to an interior of the vehicle, an exterior of the vehicle or both. The processor is coupled to the warning indicator and the indication is provided to the driver by means of the warning indicator. The warning indicator may include a visual warning signal, an audible warning signal or both a visual and an audible warning signal.

In other examples of the invention, the system includes a seat sensor disposed within the vehicle and coupled to at least a driver's seat of the vehicle. The seat sensor generates a seat signal corresponding to an orientation of the driver's seat. In this embodiment, the processor is also coupled to the seat sensor and configured to read the seat signal. The processor calculates the blind spot boundaries based on both the position signal and the seat signal.

In yet another embodiment, a driver height sensor is disposed within the vehicle and configured to measure a height of the driver. The driver height sensor generates a height signal corresponding to the height of the driver. The processor is coupled to the height sensor and configured to read the height signal. The processor calculates the blind spot boundaries based on both the position signal and the height signal. In some embodiments, the height sensor is an optical camera or an ultrasonic device.

In still another embodiment, the invention includes both a driver height sensor and a seat sensor being coupled to the processor. In these embodiments, the processor dynamically calculates the blind spot boundaries based on the position signal, the seat signal, and the height signal. As above, the processor of this embodiment compares the blind spot boundaries to the detector signal and provides an indication, or warning signal, to a driver if the objects are within the calculated blind spot boundaries.

In some embodiments, the side viewing device may include a side view mirror assembly having a mirror, which may be a convex mirror. In still other embodiments, the side viewing device may include a digital imaging device, such as a camera. The digital imaging device may be coupled to an interior display.

In another aspect, the external detector may include at least one of a radar sensor, a ladar sensor, an ultrasonic sensor, and an optical sensor. Some embodiments may use these sensors singly or in various combinations depending on the application. In one example, the optical sensor may include a digital camera.

In a further aspect, the present invention encompasses a method for monitoring a variable blind spot from a motor vehicle. The method includes monitoring a position signal, from a position sensor, corresponding to an orientation of a side view device; measuring a detector signal, from an external detector, corresponding to objects outside of the vehicle; calculating blind spot boundaries based at least upon the position signal; comparing the blind spot boundaries to the detector signal; warning a driver of the motor vehicle if the objects are located within the blind spot boundaries.

Further objects, features and advantages of this invention will become readily apparent to persons skilled in the art after a review of the following description, with reference to the drawings and claims that are appended to and form a part of this specification.

DETAILED DESCRIPTION

Figure 1:
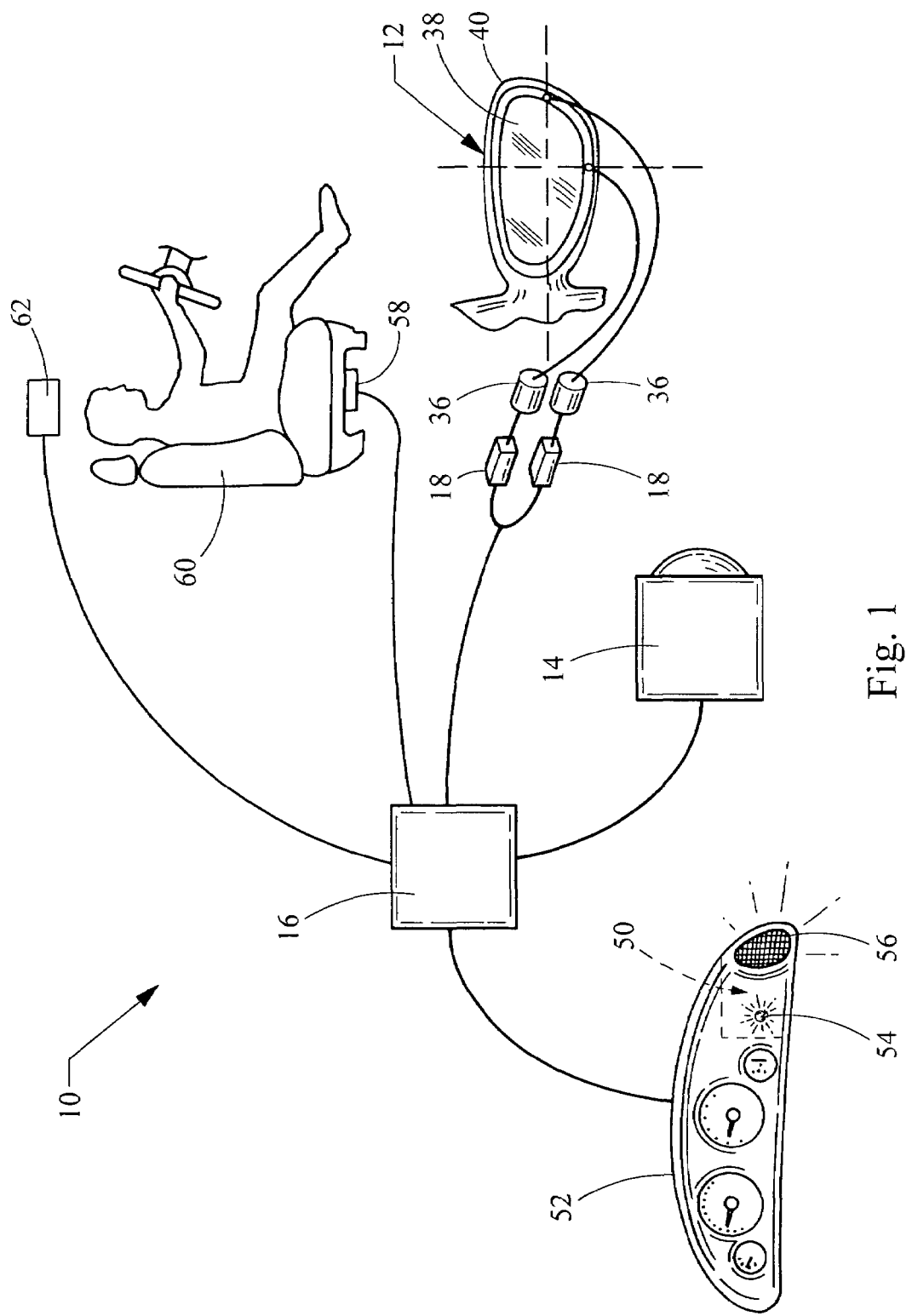
FIG. 1 is a schematic diagram of a variable blind spot warning system for a motor vehicle.

Referring now to the figures, a blind spot warning system embodying the principles of the present invention is illustrated therein and generally designated at 10. As its primary components, the warning system 10 includes a movable side view device 12 attached to a side of a motor vehicle 11, an external detector 14 also attached to the motor vehicle 11, and a processor 16, which is disposed within the motor vehicle 11 and coupled to the external detector 14 and the side view device 12.

Figure 2:
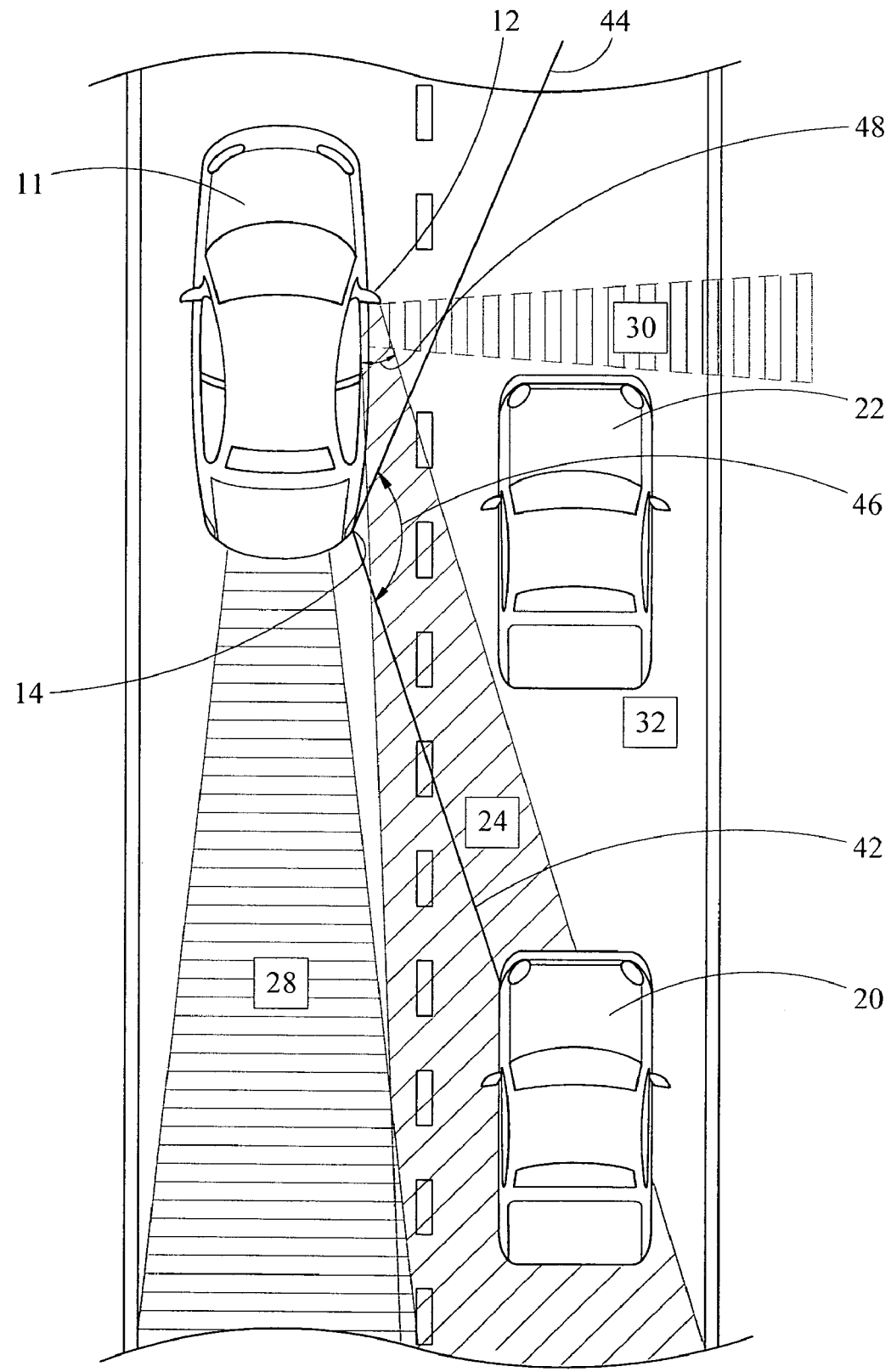
FIG. 2 is a top view of a roadway showing three motor vehicles and further showing the various fields of view and blind spots of one of the motor vehicles.

As best shown in FIG. 2, the movable side view device 12 is configured to provide a driver of the motor vehicle 11 with a view of the area beside and to the rear of the motor vehicle 11, as indicated by a first viewing area 24. As can be seen, the side view device 12 has a limited viewing angle 48. Therefore, the side view device 12 only allows the driver to see objects within the first viewing area 24, for example, a second motor vehicle 20. This means that a third motor vehicle 22, located in an area 32 not within the first viewing area 24, a rear view area 28, and a driver's peripheral view 30, is not visible to the driver. The area 32 in which the third motor vehicle 22 is not visible to the driver is known as a blind spot and is hereafter referred to as first blind spot 32.

Figure 3:
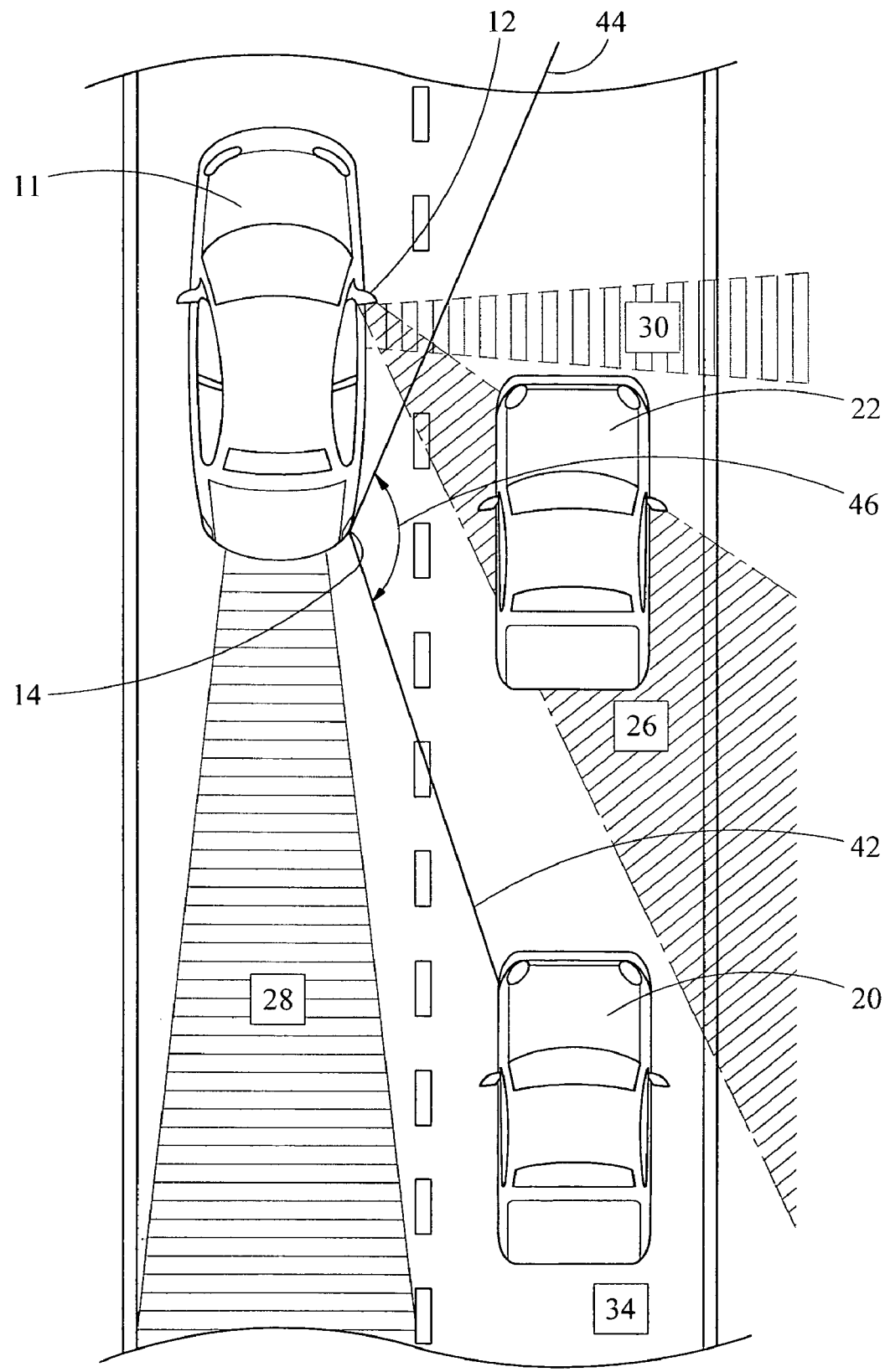
FIG. 3 is a top view, similar to FIG. 2, showing altered fields of view and altered blind spots of the motor vehicle when a side view mirror is moved.

To check for objects in the first blind spot 32, the driver may choose to look over his or her shoulder or may choose to adjust the movable side view device 12 outward (relative to the vehicle 11). If the moveable side view device 12 is moved outward, as shown in FIG. 3, a second viewing area 26, and hence the third motor vehicle 22, becomes visible to the driver. However, as can be seen, a new second blind spot 34 is thereby created where the second motor vehicle 20 is no longer visible to the driver. Currently known blind spot detection devices cannot accommodate the situation where the blind spot is moved or changed as a result of movement of the side viewing device. The present invention is a warning system 10 that can accommodate that change.

Returning to FIG. 1, in the warning system 10 of the present invention, a position sensor 18 is coupled to the side view device 12, which may be adjusted manually or by electric motors 36. The position sensor is configured to respond to the movement of the side view device 12 and generate a position signal corresponding to the orientation of the side view device 12. The position sensor 18 may be any conventional device known in the art including, but not limited to, potentiometers.

In some embodiments, the side view device 12 may include a conventional side view mirror assembly. The side view mirror assembly may include a reflecting member 38 movably disposed within a stationary housing 40. In another example, the entire housing 40 may be movable in addition to, or instead of, the reflecting member 38. The reflecting member 38 may include a flat mirror, a convex mirror or both types of mirrors in combination.

In other embodiments, the side view device 12 may include a digital imaging device (not shown). The digital imaging device may, for example, be a digital video camera coupled to an interior video display. In this embodiment, the digital video camera captures images of the view area beside and to the rear of the motor vehicle. Those images are shown to the driver on the interior video display. In one example, only the digital camera need be moved to alter the field of view of the camera.

The external detector 14 is configured to generate a detector signal corresponding to a location of objects such as, for example, the second and third motor vehicles 20 and 22 relative to the motor vehicle 11. Turning to FIG. 2, the external detector 14 has a detector angle of view 46, defined between lines 42 and 44. As clearly shown in FIG. 2, both the second and third motor vehicles 20 and 22 are encompassed by the angle of view 46.

The external detector 14 may be any non-contact device capable of remotely detecting objects including, but not limited to, radar sensors, ladar sensors, lidar sensors, ultrasonic sensors, and optical sensors. Radar sensors scan the angle of view 46 by transmitting radio waves throughout the angle of view 46. The radar sensor detects any radio waves reflected from the surfaces of the motor vehicles 20 and 22, or any other objects, and determines the position, velocity, and other characteristics of the detected objects by analyzing the reflected radio waves.

The ladar and lidar sensors are basically forms of laser radar. Ladar stands for "laser detection and ranging" and lidar stands for "light detection and ranging" and they may be used interchangeably with one another. These sensors use laser light to scan the angle of view 46 and analyze any reflected laser light to locate and characterize the objects. The lader or lidar sensor may use any appropriate form of light including, for example, ultraviolet, visible, or near infrared laser light.

The ultrasonic sensor operates similar to the radar and ladar sensors. However, rather than electromagnetic radiation, they use ultra high frequency sound waves to scan the angle of view 46. Any reflected sound waves are detected and analyzed to locate and characterize the objects.

An optical sensor operates differently from the other sensors discussed above since it is completely passive. The optical sensor may include at least one digital video camera that monitors the angle of view 46. When objects move into the angle of view 46, electronics included with the optical sensor analyze the images captured by the video camera and to identify the location and other characteristics of the objects. As above, this information is then converted by the electronics into a detector signal corresponding to the location of the objects.

As noted above, the system 10 includes a processor 16, which can be any conventional digital or analog device capable of monitoring input signals, performing calculations, comparing the signals, and initiating an appropriate response. In a preferred embodiment, the processor 16 is a digital signal processor configured to continuously monitor the position signal generated by the position sensor 18 and the detector signal generated by the external detector 14. The processor 16 may also store various physical constants including, for example, the viewing angle 48 of the side view device 12, and any other constants necessary to characterize the geometry of the motor vehicle 11.

The processor 16 is further configured to analyze the position signal to determine the orientation of the side view device 12. Once the orientation of the side view device 12 has been determined, that information is used by the processor 16, along with the viewing angle information and other stored characteristics, to continuously calculate the boundaries of the first blind spot 32. When the orientation of the side view device 12 changes, as further discussed below, so do the calculated boundaries of the blind spot.

The processor 16 is also configured to analyze the detector signal to determine the location of any objects with respect to the motor vehicle 11. The processor 16 then compares the locations of the objects with the calculated boundaries of the first blind spot 32 (see FIG. 2). If any objects are located within the boundaries of, for example, the first blind spot 32, the processor 16 is configured to provide an indication to the driver.

When the side view device 12 is moved, for example, by the driver of the motor vehicle 11, an altered position signal is generated by the position sensor 18. As indicated above, the processor 16 calculates an altered set of boundaries corresponding to, for example, the second blind spot 34 (see FIG. 3). As above, the processor 16 compares the locations of the objects with the altered boundaries of the second blind spot 34. If any objects are located within the boundaries of the second blind spot 34, the processor 16 provides an indication to the driver.

It should be appreciated that the processor 16 is able to respond to any changes as they occur since it continuously performs these calculations. Thus, the processor 16 is able to dynamically adjust to any changes in the blind spot location or the traffic as they occur, allowing the warning system 10 to provide more reliable and accurate warnings to the driver.

Returning to FIG. 1, the indication to the driver may be provided by, for example, means of a warning indicator 50 coupled to the processor 16. The warning indicator 50 may, for example, be incorporated into an instrument cluster 52 of a vehicle instrument panel inside of the motor vehicle 11. The warning indicator 50 preferably includes a visual warning signal 54 or an audible warning signal 56. The visual warning signal 54 may be a light or series of lights that indicate the presence, and optionally the location, of an object within the vehicle blind spot. In addition to, or in place of, the visual warning signal 54 a tone or other audible warning may be provided either through, for example, a dedicated speaker 56 as shown in FIG. 1 or through a vehicle audio system (not shown). In another example, the indication may optionally be provided by an exterior indicator. For example, the reflecting member 38 of the side view device may include lights, such as LED's, to warn the driver (not shown). In still other examples, the indication to the driver may be provided by both interior and exterior warning indicators.

In another aspect, the warning system 10 may include a seat sensor 58 disposed within the motor vehicle 11 and coupled to a driver seat 60. Similar to the position sensor 18, the seat sensor 58 generates a seat signal corresponding to an orientation of the driver seat 60. In this embodiment, the processor 16 is also coupled to the seat sensor 58 and is configured to analyze the seat signal to determine the orientation of the driver seat 60 and, hence, the position of the driver within the motor vehicle 11. The processor 16 may then calculate, for example, the approximate position of the driver's eyes within the motor vehicle 11 and use that information, along with the orientation of the side view device 12, to improve the calculation of the boundaries of the driver's blind spot. This increases the accuracy of the comparison by the processor 16 of the object locations to the calculated boundaries, reducing the possibility of false positive indications that objects are within the driver's blind spots.

Yet another embodiment of the warning system 10 may include a driver height sensor 62 disposed within the motor vehicle 11. Depending on the particular application, the driver height sensor 62 may be in addition to, or instead of, the seat sensor 58. The height sensor 62 may be placed anywhere within the motor vehicle 11 appropriate for a particular sensor type to measure the seated height of the driver and generate a height signal corresponding to the height of the driver. The processor 16 is coupled to the height sensor 62 and is configured to analyze the height signal to, for example, calculate the height of the driver and the approximate position of the driver's eyes. Once the position of the driver's eyes have been calculated a sight line of the driver to the side view device 12 may be calculated allowing further refinement of the blind spot boundaries. This and other calculations mentioned herein are well within the constraints of conventional engineering and need not be detailed further since they will be readily appreciated and derivable by those skilled in the art.

The driver height sensor 62 may be any appropriate sensing device including, for example, an ultrasonic sensor. As described above, the ultrasonic sensor uses high frequency sound waves reflected off an object to characterize the object. In one example, the ultrasonic sensor may be attached to an interior roof of the motor vehicle. The sound waves are directed to reflect off of the top of the driver's head. Electronics associated with the ultrasonic sensor measure the time it takes the reflected sound waves to return to the sensor, thereby determining the distance between the ultrasonic sensor and the top of the driver's head. The processor may then use that information, along with other stored information regarding human attributes and the geometry of the motor vehicle, to calculate the height of the driver and the approximate position of the driver's eyes.

In another embodiment, the height sensor 62 may include a visual system. The visual system makes use of, for example, a digital camera positioned to image the head of the driver. Electronics within the height sensor 62, or the processor 16, analyze the image. Based on the location of the height sensor 62 within the motor vehicle 11, the electronics can calculate the height of the driver and a position of the driver's eyes. Depending on the precise location of the height sensor 62, this embodiment may allow the position of the driver's eyes to be directly measured, further increasing the accuracy of the calculated blind spot boundaries.

Another embodiment may further refine the calculation of the blind spot boundaries. This embodiment includes both the seat sensor 58 and the height sensor 62. The processor calculates, for example, the position of the driver's eyes within the motor vehicle 11 using both the seat signal and the height signal to maximize the accuracy of the calculation and further reduce the possibility of false positive indications.

Figure 4:
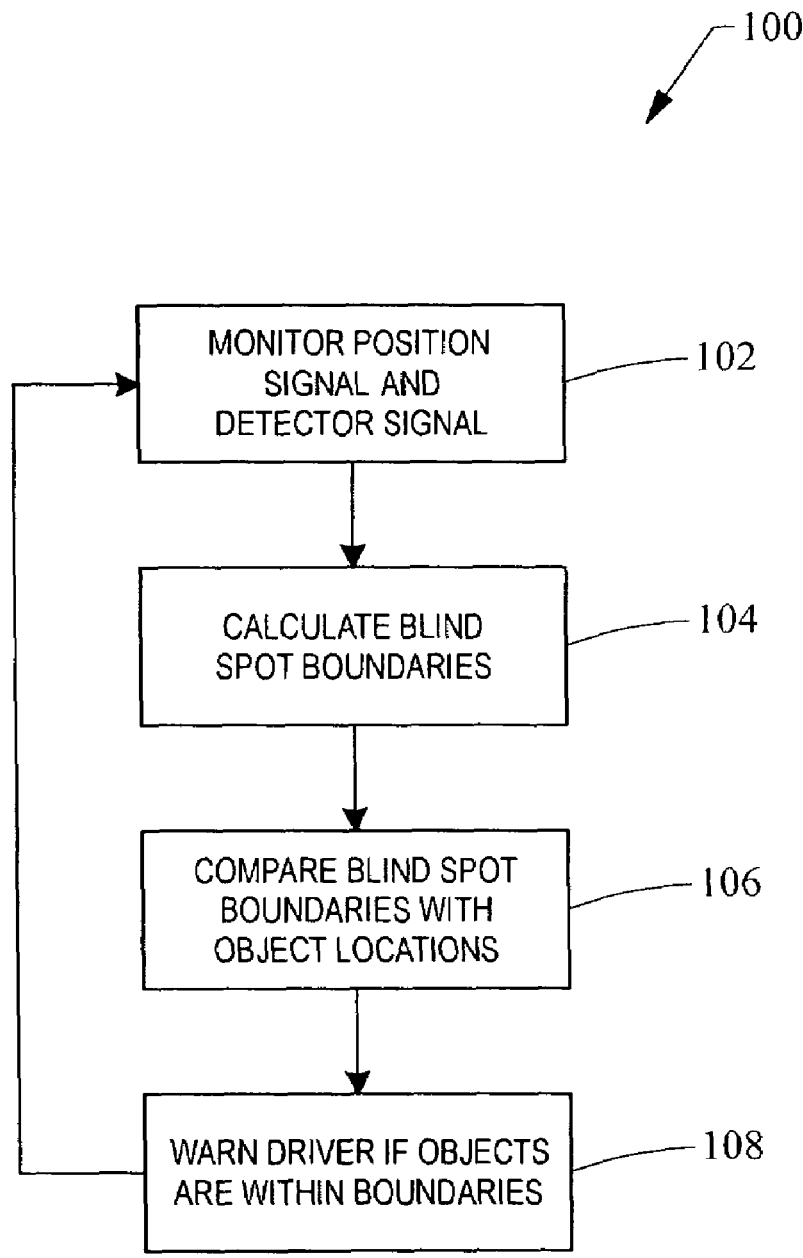
FIG. 4 is a flow chart illustrating a method for detecting objects within a variable blind spot location.

In a further aspect of the present invention, a variable blind spot warning method 100, illustrated in the flow chart of FIG. 4, is provided. The method 100 includes monitoring both a position signal from the position sensor and a detector signal from the external detector in box 102. Next, in box 104, blind spot boundaries are calculated based upon at least the position signal. In box 106, the processor compares the calculated blind spot boundaries with a location of objects as determined from the detector signal. Finally, in box 108, the driver of the motor vehicle is warned if objects are detected as being within the blind spot boundaries.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

I claim:

1. A variable blind spot warning system for detecting objects in a blind spot of a motor vehicle, the system comprising:

at least one movable side view device being attached to the vehicle and moveable between a first orientation and a second orientation, the side viewing device being coupled to at least one position sensor adapted to generate a position signal corresponding to an orientation of the side view device;

at least one external detector being attached to the vehicle and generating a detector signal corresponding to a location of object outside of the vehicle; and a processor being disposed within the motor vehicle and coupled to the position sensor and the external detector to receive the position signal and the detector signal, the processor being configured to calculate blind spot boundaries based on the position signal and to compare the blind spot boundaries to the location of objects outside of the vehicle, and a blind spot warning indicator coupled to the processor and configured to provide an indication to a driver if an object is located within the calculated blind spot boundaries.

2. The system of claim 1 wherein the position sensor is configured to generate a modified position signal upon movement of the side view device and the processor is configured to calculate altered blind spot boundaries based upon the modified position signal and compare the altered blind spot boundaries to the location of objects to provide an indication to the driver if an object is within the altered blind spot boundaries.

3. The system of claim 1 further comprising the warning indicator being attached to an interior of the vehicle, an exterior of the vehicle, or both the interior and exterior of the vehicle.

4. The system of claim 3 wherein the warning indicator is at least one of a visual warning device and an audible warning device.

5. The system of claim 1 further comprising a seat sensor being disposed within the vehicle and coupled to at least a driver seat of the motor vehicle, the seat sensor generating a seat signal corresponding to an orientation of the driver seat.

6. The system of claim 5 wherein the processor is coupled to the seat sensor and configured to calculate the blind spot boundaries based on both the position signal and the seat signal.

7. The system of claim 1 further comprising a driver height sensor disposed within the vehicle and configured to measure a height of the driver and to generate a height signal corresponding to the height of the driver.

8. The system of claim 7 wherein the processor is coupled to the height sensor and configured to calculate the blind spot boundaries based on both the position signal and the height signal.

9. The system of claim 7 wherein the height sensor includes an ultrasonic device.

10. The system of claim 7 wherein the height sensor includes an optical camera.

11. The system of claim 1 wherein the side view device includes a side view mirror assembly.

12. The system of claim 11 wherein the mirror assembly includes a convex mirror.

13. The system of claim 1 wherein the side view device includes a digital imaging device.

14. The system of claim 13 wherein the digital imaging device is coupled to an interior display.

15. The system of claim 1 wherein the external detector includes at least one of a radar sensor, a ladar sensor, a lidar sensor, an ultrasonic sensor, and an optical sensor.

16. The system of claim 1 further comprising a seat sensor being disposed within the vehicle and coupled to at least a driver seat of the vehicle, the seat sensor generating a seat signal corresponding to an orientation of the driver seat;

a driver height sensor disposed within the vehicle and configured to measure a height of a driver of the vehicle, the height sensor generating a height signal corresponding to the height of the driver; and the processor being coupled to the seat sensor and the height sensor to receive the seat signal and the height signal, the processor being configured to calculate the blind spot boundaries based on the position signal, the seat signal, and the height signal.

* * * * *